(12) United States Patent
Wang (10) Patent No.: US 12,132,850 B2
(45) Date of Patent: Oct. 29, 2024

(54) DISPLAY DEVICE AND DISPLAY APPARATUS

(71) Applicant: WUHAN CHINA STAR OPTOELECTRONICS SEMICONDUCTOR DISPLAY TECHNOLOGY CO., LTD., Wuhan (CN)

(72) Inventor: Wenqiang Wang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/621,213

(22) PCT Filed: Sep. 7, 2021

(86) PCT No.: PCT/CN2021/116881
§ 371 (c)(1),
(2) Date: Dec. 20, 2021

(87) PCT Pub. No.: WO2023/024158
PCT Pub. Date: Mar. 2, 2023

(65) Prior Publication Data
US 2024/0031465 A1    Jan. 25, 2024

(30) Foreign Application Priority Data

Aug. 24, 2021  (CN) .......................... 202110974055.2

(51) Int. Cl.
*H04M 1/02* (2006.01)
*H04N 23/667* (2023.01)

(52) U.S. Cl.
CPC ....... *H04M 1/0268* (2013.01); *H04M 1/0264* (2013.01); *H04N 23/667* (2023.01)

(58) Field of Classification Search
CPC .............. H04M 1/0268; H04M 1/0264; H04N 23/667; G09F 9/301
See application file for complete search history.

(56) References Cited

U.S. PATENT DOCUMENTS

2008/0303782 A1   12/2008  Grant et al.
2020/0371558 A1*  11/2020  Kim .................... H04M 1/0237
2022/0291713 A1*  9/2022   Zhang .................. G06F 1/1652

FOREIGN PATENT DOCUMENTS

CN        1948770 A     4/2007
CN       101106884 A    1/2008
(Continued)

*Primary Examiner* — Yogesh K Aggarwal
(74) *Attorney, Agent, or Firm* — The Roy Gross Law Firm, LLC; Roy Gross (57) ABSTRACT

The present application provides a display device and a display apparatus, and the display device includes a middle frame, a rotating mechanism, a flexible display module, and a driving mechanism. The middle frame includes a first side surface and a second side surface, and the driving mechanism connected to the flexible display module, configured to drive the additional function area of the flexible display module to the second side surface when the display device runs a first function, or configured to drive the additional function area of the flexible display module to the first side surface when the display device runs a second function.

19 Claims, 7 Drawing Sheets

(56) References Cited

FOREIGN PATENT DOCUMENTS

| | | | |
|---|---|---|---|
| CN | 101848617 | A | 9/2010 |
| CN | 110187742 | A | 8/2019 |
| CN | 110300195 | A | 10/2019 |
| CN | 111524459 | A | 8/2020 |
| CN | 112150930 | A | 12/2020 |
| CN | 112532770 | A | 3/2021 |
| CN | 112839116 | A | 5/2021 |
| CN | 112991955 | A | 6/2021 |
| EP | 3742711 | A1 | 11/2020 |
| IN | 113194179 | A | 7/2021 |

\* cited by examiner

DISPLAY DEVICE AND DISPLAY APPARATUS

CROSS REFERENCE TO RELATED APPLICATIONS

This application is a National Phase of PCT Patent Application No. PCT/CN2021/116881 having International filing date of Sep. 7, 2021, which claims the benefit of priority of Chinese Application No. 202110974055.2 filed on Aug. 24, 2021. The contents of the above applications are all incorporated by reference as if fully set forth herein in their entirety.

FIELD OF INVENTION

The present application relates to a display technology field, and particularly to a display device and a display apparatus.

BACKGROUND

Full-screen mobile phones have always been a popular technology in the industry for increasing a screen-to-body ratio. In order to maximize the screen-to-body ratio, an under-screen camera (i.e. camera-under display, UDC) technology have been proposed by the display panel researchers. However, due to technical issues such as process, material, and optical design, the under-screen camera technology cannot achieve the demand for high transmitting rate so that mass production therefore is not achieved. Therefore, various end mobile phone manufacturers consider other alternatives solutions to realize the market layout of full-screen mobile phones.

At present, two types of solution such as a slide-out camera and a pop-up camera have been configured to realize the hidden camera of the full-screen mobile phones on the market. Among them, the sliding-out camera adopts a screen-frame separation design, that is, the screen can slide in a vertical direction of a middle frame through a sliding mechanism set inside the middle frame of the mobile phone, so as to realize hiding and extending out of the camera module hidden inside the middle frame. However, this solution is not conducive to the light and thin design of the whole mobile phone, and the design and assembly of the sliding mechanism are very complicated, which has a low yield and high cost. Moreover, when the screen has a certain number of sliding, wear to the sliding mechanism will become serious, and failure risk of screen is higher.

The pop-up camera mainly hides a whole front camera module inside the middle frame, and the screen does not need to be punched. When a front camera mode is turned on, a driver motor of the camera is controlled by a program to realize the pop-up action of the camera. The pop-up camera solves the complicated assembly problem of the slide-out camera. However, the drive motor of the camera is more expensive and the power consumption of the drive motor is large. Therefore, battery capacity requirements are higher, which is not conducive to a long-term battery life design of the mobile phone.

Accordingly, the hidden camera configured to realize a full-screen mobile phone has technical problems such as complex assembly, low yield, high cost, and high failure risk of screen.

SUMMARY OF DISCLOSURE

The purpose of this application is to provide a display device and a display device, which are configured to solve the problems of complex assembly, low yield, high cost, and high risk of screen failure in the above-mentioned hidden camera configured to realize a full-screen mobile phone. technical problem.

In order to solve the above problems, technical solutions provided by the present application are as follows:

An embodiment of the present application provides a display panel, comprising:
- a middle frame, comprising a first side surface and a second side surface;
- a rotating mechanism arranged in the middle frame;
- a flexible display module, comprising a display area and an additional function area, wherein a light-emitting surface of the flexible display module is arranged on the first side surface and away from the second side surface, the flexible display module comprises at least a first bendable portion, and the first bendable portion extends from the first side surface of the middle frame to the second side surface around the rotating mechanism; and
- a driving mechanism, arranged in the middle frame and connected to the flexible display module, configured to drive the additional function area of the flexible display module to the second side surface when the display device runs a first function, or configured to drive the additional function area of the flexible display module to the first side surface when the display device runs a second function.

In some embodiments, the flexible display module further comprises a second bendable portion disposed opposite to the first bendable portion, and the second bendable portion extends from the first side surface of the middle frame to the second side surface and surrounds the rotating mechanism; and
  the display device further comprises a stretching mechanism provided on a second side surface of the middle frame, and the stretching mechanism is respectively connected with the first bendable portion and the second bendable portion of the flexible display module.

In some embodiments, the flexible display module comprises a metal supporting plate and a display panel arranged on the metal supporting plate, the metal supporting plate comprises a first end and a second end, the first end portion corresponds to the first bendable portion of the second side surface, and the second end portion corresponds to the second bendable portion of the second side surface; and
  the stretching mechanism comprises a plurality of first elastic members, one end of the plurality of first elastic members is fixed in the middle frame and the other end is respectively connected with the first end and the second end.

In some embodiments, a tensile force of the first elastic member connected to the first end is equal to the tensile force of the first elastic member connected to the second end.

In some embodiments, the first end portion and the second end portion are provided with notches, and the first elastic member is connected to the first end and the second end through the notches.

In some embodiments, the notches located at the first end are paired and arranged symmetrically with a center line of the flexible display module, and the notches located at the second end are paired and arranged symmetrically with a center line of the flexible display module, and each first elastic member is correspondingly connected with a notch.

In some embodiments, the rotating mechanism comprises a first reel and a second reel arranged in the middle frame, and the first reel and the second reel are respectively correspondingly arranged in an inner area of the first bendable portion and the second bendable portion.

In some embodiments, the driving mechanism comprises a push plate and an elastic push-pin, wherein:
 the push plate is arranged under the flexible display module, the push plate comprises a flat area and at least one side area, the flat area is attached to the flexible display module, and the at least one side area is provided with a first hole and second hole;
 the elastic push-pin is arranged on at least one side surface of the middle frame, and is located in a hollow portion of at least one side surface of the middle frame, the elastic push-pin comprises a first convex portion and a second convex portion and a connecting portion connecting the first convex portion and the second convex portion on both sides thereof, and a thickness of the middle area of the connecting portion is smaller than a thickness of the both sides; and
 the elastic push-pin is correspondingly connected to the at least one side area of the push plate.

In some embodiments, the driving mechanism further comprises a limiting mechanism, the limiting mechanism comprises a positioning member, the positioning member is arranged in the middle frame, and the first hole and the second hole of the push plate slidingly correspond to the positioning member.

In some embodiments, an elastic member is provided at one end of the positioning member, and the positioning member is connected to the elastic member and fixed in the middle frame.

In some embodiments, the first protrusion of the elastic push-pin is engaged with the first hole of the push plate, and the second protrusion is engaged with the second hole of the push plate.

The present application further provides a display apparatus, comprising the display device described above 1 and a sensing unit.

Beneficial effect of the present application is that the display device of the present application can drive the additional function area of the flexible display module to the second side surface when the display device runs the first function through the rotating mechanism and the driving mechanism, or to the first side when the display device runs the second function. In this way, the flexible display module and the middle frame can be assembled easily and reliably. Through the mutual cooperation of the rotating mechanism and the driving mechanism, the additional function area can be hidden and exposed, thereby realizing an effect of free switching of a full-screen display mode and a front camera mode. Therefore, the display device of the present application is simple to assemble, has a higher yield, lower cost, and has a lower failure risk of screen.

BRIEF DESCRIPTION OF DRAWINGS

In order to more clearly illustrate technical solutions in embodiments of the present disclosure, a brief description of accompanying drawings used in a description of the embodiments will be given below. Obviously, the accompanying drawings in the following description are merely some embodiments of the present disclosure. For those skilled in the art, other drawings may be obtained from these accompanying drawings without creative labor.

DETAILED DESCRIPTION

Embodiments of the present application provide a display panel and a fabrication method thereof, and a mobile terminal. Detailed descriptions are given below. It should be noted that the order of description in the following embodiments is not intended to limit the preferred order of the embodiments.

In the description of this application, it needs to be understood that the terms "center", "longitudinal", "transverse", "length", "width", "thickness", "upper", "lower", "front", ""rear", "left", "right", "vertical", "horizontal", "top", "bottom", "inner", "outer", "clockwise", "counterclockwise" and other directions or a positional relationship is based on the position or positional relationship shown in the drawings, which is only for the convenience of describing the application and simplifying the description, and does not indicate or imply that the pointed device or element must have a specific orientation, be constructed and operated in a specific orientation, Therefore, it cannot be understood as a restriction on this application. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly comprise one or more of the features. In the description of the present application, "a plurality of" means two or more than two, unless otherwise specifically defined.

In the drawings, components with the same structure are denoted by the same numerals, and components with similar structures or functions are denoted by similar numerals. In addition, for ease of understanding and description, the size and thickness of each component shown in the drawings are arbitrarily shown, and the present invention does not limit the size and thickness of each component.

When certain components are described as being "on" another component, the component can be directly placed on the other component; there may also be an intermediate component on which the component is placed, And the intermediate component is placed on another component. When a component is described as "installed to" or "connected to" another component, both can be understood as directly "installed" or "connected", or a component is "installed to" or "connected to" through an intermediate component Another component.

Technical solutions of the present application will now be described together with specific embodiments.

Figure 1A:
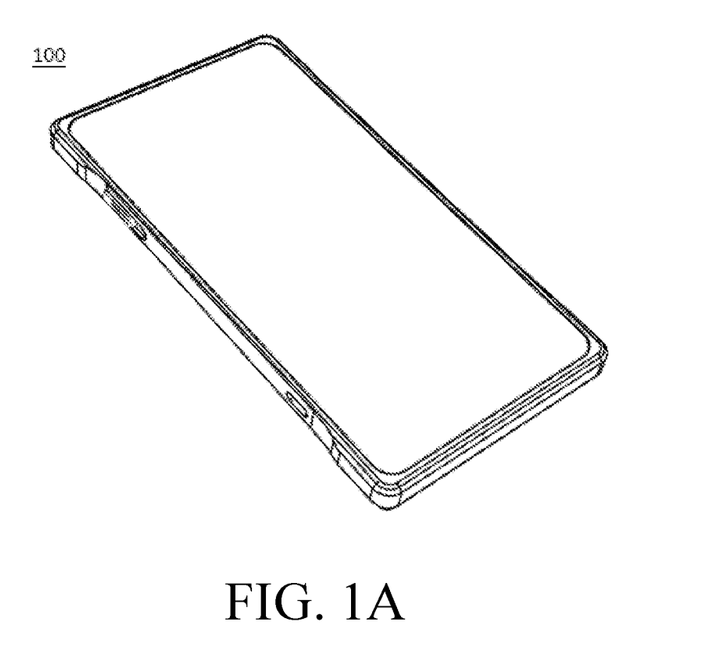
FIG. 1A is a schematic diagram of a display device in a full-screen display state in an embodiment of the application.
Figure 1B:
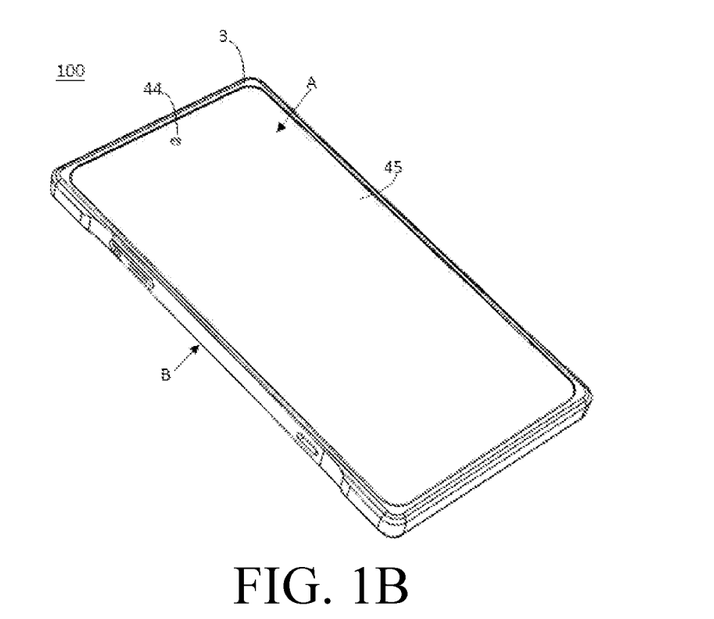
FIG. 1B is a schematic diagram of a display device in a front camera mode state in an embodiment of the application.
Figure 2A:
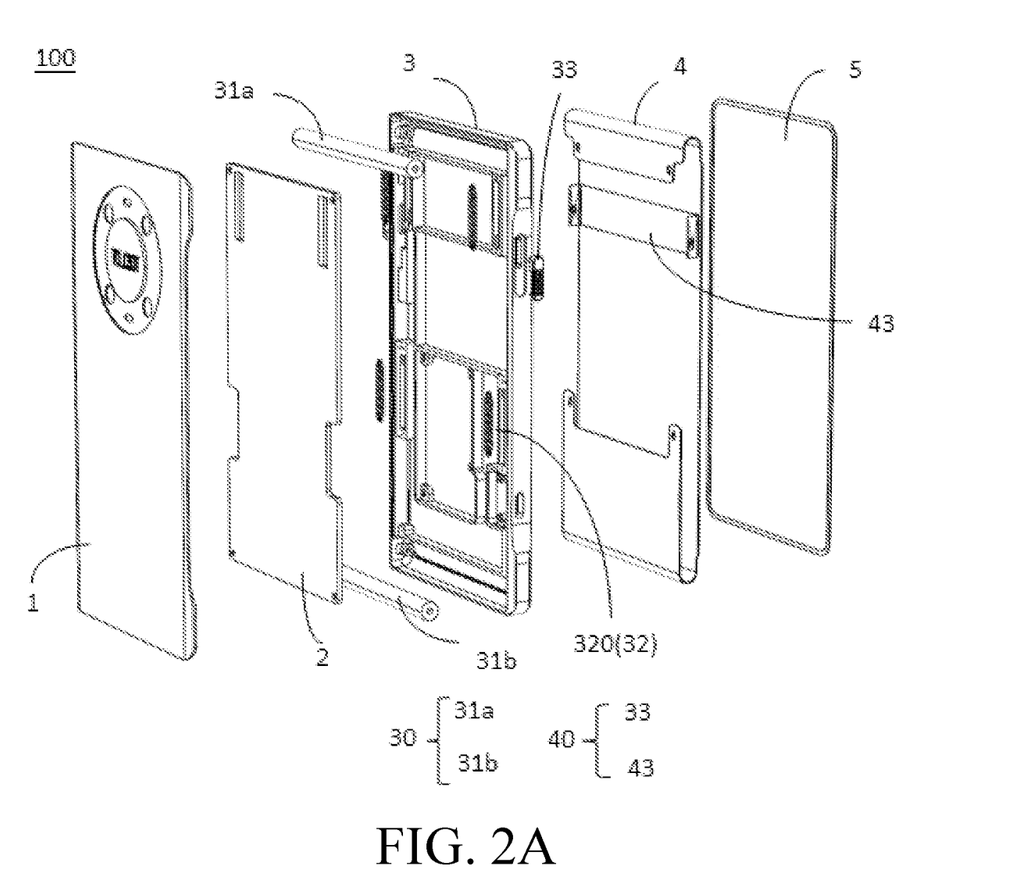
FIG. 2A is an exploded schematic diagram of a rear view of a display device in an embodiment of the application.
Figure 2B:
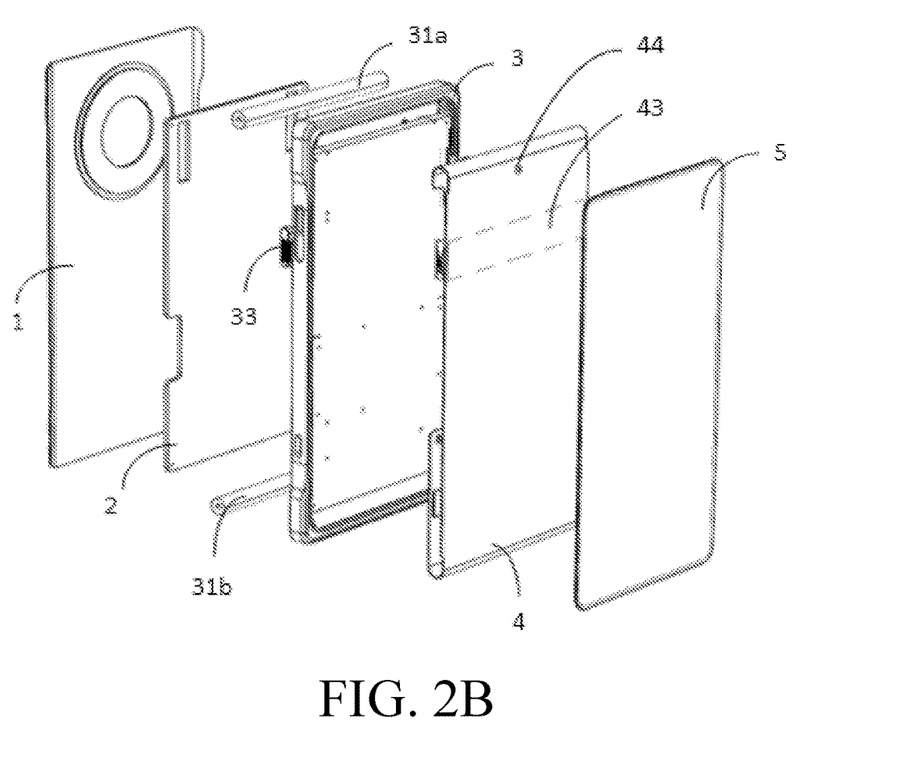
FIG. 2B is an exploded schematic diagram of a front view of the display device in an embodiment of the application.

The present application provides a display device 100, as shown in FIGS. 1B, 2A and 2B. The display device 100 comprises a back cover 1, a mounting plate 2, a middle frame 3, a flexible display module 4, a rotating mechanism 30, and a driving mechanism 40 and a cover 5.

The middle frame 3 comprises a first side surface A and a second side surface B. The rotating mechanism 30 is arranged in the middle frame 3. The flexible display module 4 comprises a display area 45 and an additional function area 44. The light-emitting surface of the display module 4 is arranged on the first side surface A and away from the second side surface B. The flexible display module 4 comprises at least a first bendable portion BA1, and the first bendable portion BA1 extends from the first side surface A of the middle frame 3 to the second side surface B around the rotating mechanism 30.

The driving mechanism 40 is arranged in the middle frame 3 and connected to the flexible display module 4, and is configured to drive the addition function area of the flexible display module 4 to the second surface B when the display device 100 runs a first function, or is configured to drive the additional function area 44 of the flexible display module 4 to the first side surface A when the display device 100 runs a second function.

Therefore, the display device 100 of the present application, through the rotating mechanism 30 and the driving mechanism 40, is able to drive the additional function area 44 of the flexible display module 4 to the second side surface B when the display device runs the first function, or is able to drive the additional function area 44 of the flexible display module 4 to the first side surface A when the display device 100 runs the first function, thereby realizing that the flexible display module 4 and the middle frame 3 can be assembled easily and reliably. In addition, the additional function area 44 can be covered and exposed through the mutual cooperation of the rotating mechanism 30 and the driving mechanism 40, thereby realizing effects of free switching between the full-screen display and the front camera mode. Therefore, the display device 100 of the present application is simple to assemble, and has a higher yield, lower cost, and a lower failure risk of screen.

Each component will be explained below.

The back cover 1 is configured to protect elements arranged on a back of the display device 100, and the back cover 1 may be a material resistant to physical and chemical abrasion, such as a composite plastic plate.

It is understandable that the back cover 1 may also be provided with an opening area to provide the light required by the rear camera.

The mounting plate 2 is arranged between the back cover 1 and the middle frame 3, and is configured to fix elements in the middle frame 3, so as to further make the assembly of the elements more stable and reduce the failure risk of the screen. In addition, the mounting board 2 has high mechanical strength and wear resistance, so it also has the function of protecting the display device 100. The material can be a high-hardness thermoplastic resin, such as acrylonitrile-butadiene-styrene copolymer (ABS).

The middle frame 3 is arranged on the mounting board 2 and is equipped with a sensing unit (e.g., a camera, not shown in the figure). A material of the middle frame 3 is high-strength metal or alloy, such as high-strength aluminum alloy.

Figure 4:
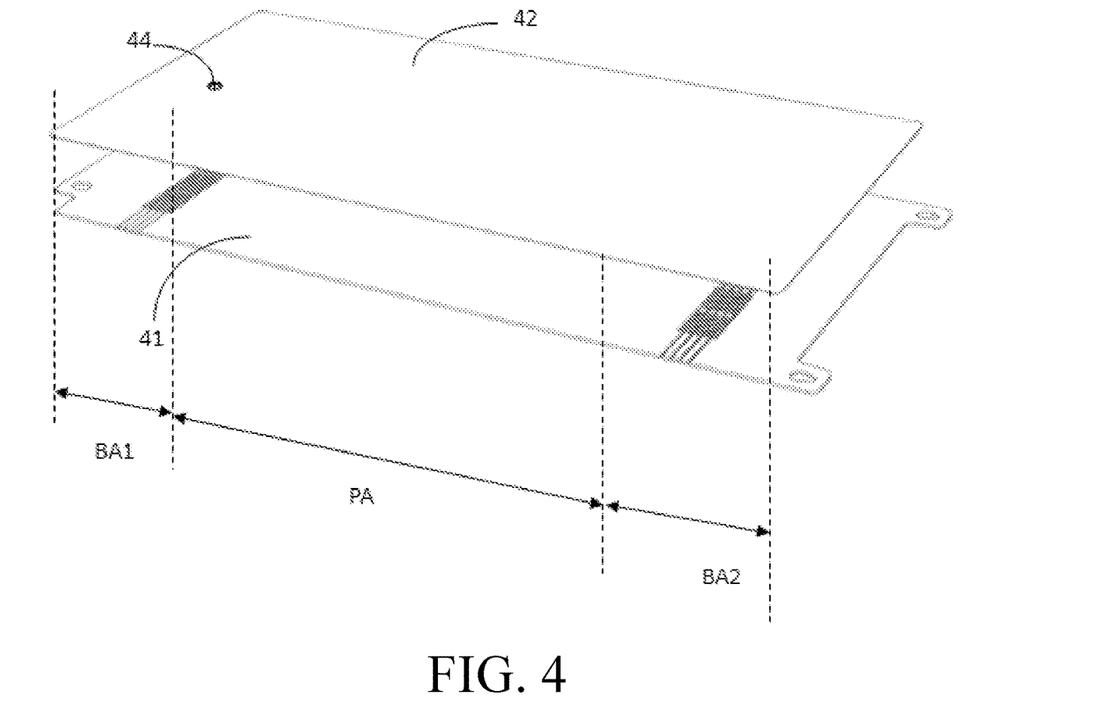
FIG. 4 is a schematic diagram of the structure of the flexible display module before assembling in an embodiment of the application.

Further, as shown in FIG. 4, the flexible display module 4 is disposed on the middle frame 3 and comprises a flat portion PA and a first bendable portion BA1 and a second bendable portion BA2 extending along a length direction of the flat portion PA. The first bendable portion BA1 and the second bendable portion BA2 are opposite to each other, and the second bendable portion BA2 extends from the first side surface A of the middle frame 3 to the second side surface B around the rotating mechanism 30. A side of the first bendable portion BA1 close to the flat portion PA is provided with the additional function area 44, and the additional function area 44 slidingly corresponds to the camera. Specifically, the additional function area 44 may be a light-transmitting area.

The display device 100 further comprises a stretching mechanism 320 disposed on the second side B of the middle frame 3, and the stretching mechanism 320 is respectively connected to the first bendable portion BA1 and the second bendable portion BA2 of the flexible display module 4.

Furthermore, the first bendable portion BA1 and the second bendable portion BA2 respectively comprises a bendable portion fitted with upper and lower ends of the middle frame 3 and a flat portion extending into inside of the middle frame 3. Herein, the bendable portion is bent at an angle of 180 degrees to fit with the upper and lower ends of the middle frame 3, so that the flat portions of the first bendable portion BA1 and the second bendable portion BA2 in the middle frame 3 are parallel to correspond to the middle frame 3 to ensure that the flexible display module 4 can be scrolled smoothly, thereby reducing the failure risk of screen.

Figure 3:
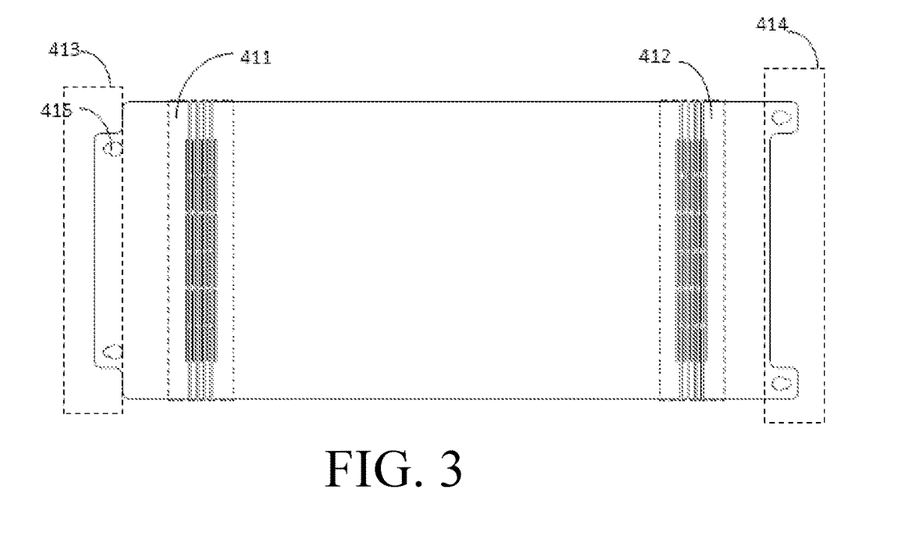
FIG. 3 is a schematic diagram of a structure of a metal supporting plate of the flexible display module in the embodiment of the application.

In an embodiment of the present application, as shown in FIGS. 3 and 4, the flexible display module 4 comprises a metal supporting plate 41 and a display panel 42 disposed on the metal supporting plate 41. The metal supporting plate 41 is correspondingly provided with a first hollow pattern 411 on the first bendable portion BA1, and is correspondingly provided with a second hollow pattern 412 on the second bendable portion BA2.

Herein, the metal supporting plate 41 and the display panel 42 can be attached to each other via an optical adhesive (OCA).

In an embodiment of the present application, the additional function area 44 may penetrate the metal supporting plate 41 and the display panel 42. In another embodiment, the additional function area 44 may only penetrate the metal supporting plate 41, and an area corresponding to the display panel 42 is a light-transmitting area without perforation. Further, the additional function area 44 may be correspondingly disposed in the first hollow pattern 411 without additional perforation.

It can be understood that, as shown in FIGS. 1A and 1B, the additional function area 44 is scrolled and hidden within the second side surface B of the middle frame 3 when the display device is running the first function (when the full screen is displayed), and is corresponding to the camera when the display device is running the second function (in the front camera mode).

Herein, the metal supporting plate 41 is a metal material, such as a stainless steel (SUS) sheet, so the metal supporting plate 41 basically maintains a certain rigidity so that the flat portion PA can maintain flatness. In addition, a first hollow pattern 411 is correspondingly provided in the first bendable portion BA1 and a second hollow pattern 412 is provided in the second bendable portion BA2, so that the bendability of the flexible display module 4 in the first bendable portion BA1 and the second bendable portion BA2 can be increased to ensure fitting of the flexible display module 4 with the upper and lower ends of the middle frame 3, and to ensure that the display panel 42 does not interact with the metal supporting plate 41 and the risks of debonding or fracture failure of the display device layer when the display panel 42 is bent and curled, thereby ensuring that the flexible display module 4 can be scrolled smoothly, and further reducing the failure risk of the screen.

In an embodiment of the present application, patterns of the first hollow pattern 411 and the second hollow pattern 412 may be strips, rectangles, rhombuses or the like arranged at intervals along a width direction of the metal supporting plate 41 to disperse bending stresses in the length direction of the metal supporting plate 41, thereby further increasing the bendability of the metal supporting plate 41 in the length direction.

In an embodiment of the present application, the metal supporting plate 41 comprises a first end 413 and a second end 414, the first end 413 corresponds to the first bendable portion BA1 of the second side surface B, and the second end portion 414 corresponds to the second bendable portion BA2 of the second side surface B.

The display panel 42 can be any flexible OLED display panel. Specifically, the display panel 42 comprises an ultrathin flexible glass cover (UTG) on an uppermost layer to reduce a thickness of the panel.

In an embodiment, the display panel 42 further comprises a substrate, a thin film transistor array layer on the substrate, a light emitting function layer on the thin film transistor array layer, and an encapsulation layer on the light emitting function layer, and a touch functional layer on the encapsulation layer.

Herein, the substrate is a flexible substrate. The thin film transistor array layer comprises a plurality of thin film transistors for driving the light emitting functional layer to work. The light emitting functional layer comprises an anode, an organic light-emitting layer and a cathode, wherein the anode provides holes, the cathode provides electrons, and the holes and electrons combine to emit light in the organic light-emitting layer to complete the corresponding image display.

The foregoing is only one of the structures of the display panel 42 and the present application is not limited thereto. Any flexible OLED display panel can be used as the display panel 42 of the present application.

Figure 7:
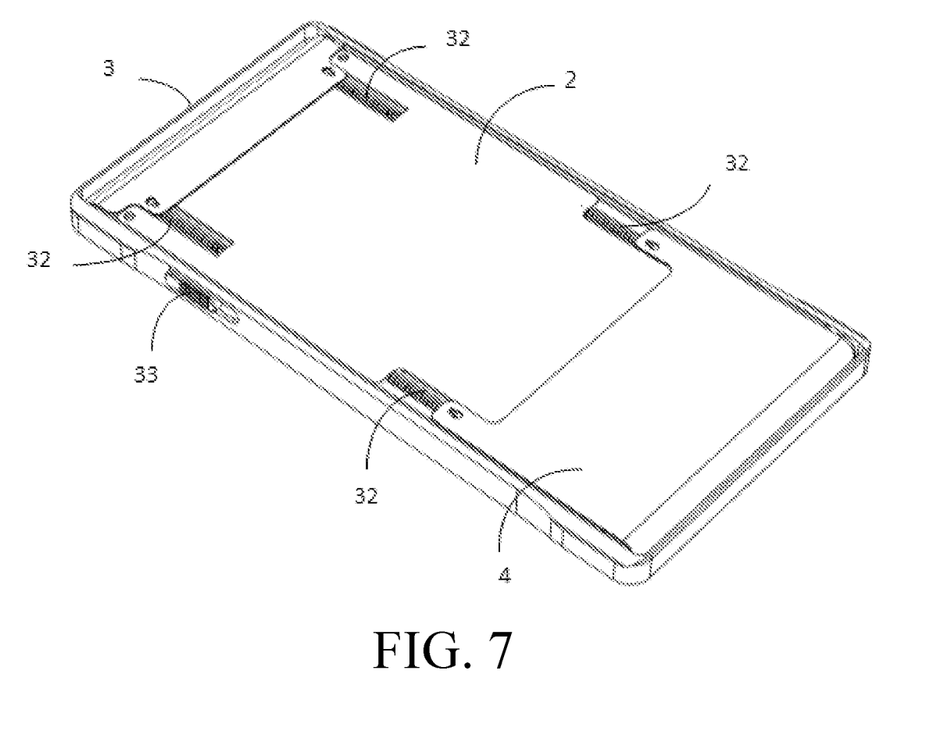
FIG. 7 is a schematic diagram of a positional relationship of a first elastic member of a display device in an embodiment of the application.

In an embodiment of the present application, as shown in FIG. 7, the stretching mechanism comprises a plurality of first elastic members 32. One end of the first elastic members 32 is fixed in the middle frame 3, and the other end thereof is respectively connected to the first end 413 of the first bendable portion BA1 and the second end 414 of the second bendable portion BA2.

It should be noted that the first end portion 413 may be a portion of the metal supporting plate 41 extending toward the middle frame 3 in the middle or on both sides of one side of the first bendable portion BA1. The two end portions 414 may also be the portions of the metal supporting plate 41 extending toward the middle frame 3 in the middle or on both sides of one side of the second bendable portion BA2.

In an embodiment of the present application, the first end 413 and the second end 414 are provided with notches 415, and the first elastic member 32 penetrates the notches 415 and the first end. The portion 413 and the second end portion 414 are connected.

Specifically, in this embodiment, the notches 415 at the first end 413 are paired and arranged symmetrically about the center line of the flexible display module 4 and are located at the second end 414. The notches 415 are also paired and arranged symmetrically with the center line of the flexible display module 4, and each first elastic member 32 is connected to a notch 415. Therefore, by this setting, the left and right sides of the flexible display module 4 can be equally stressed when the flexible display module 4 slides up and down, thereby further ensuring the flatness of the screen and increasing the reliability of its scrolling. Therefore, the display device of the present application is simple to assemble, has a higher yield, lower cost, and has a lower failure risk of screen.

In an embodiment of the present application, the notch 415 may be a gourd-shaped notch, and is connected to the first elastic member 32 by one side of a small opening, thereby facilitating disassembly, assembly and maintenance.

Further, a material of the first elastic member 32 can be spring steel and can be connected to the notch 415 with a hook, and the first elastic member 32 is connected to the corresponding notch 415 with a certain tensile force so that the flexible display module 4 can be stretched and flattened when scrolling, so that the screen can maintain better flatness, and reduce the impact of the user experience due to the unevenness of the screen during use, thereby reducing the failure risk of screen.

In an embodiment of the present application, the tensile force of the first elastic member 32 connected to the first end 413 may be equal to the tensile force of the first elastic member 32 connected to the second end 414, or the tensile force of the first elastic member 32 connected to the first end 413 is greater than or less than the tensile force of the first elastic member 32 connected to the second end 414. Therefore, by stretching the pretension force, the screen can maintain a better flatness, and the user experience can be reduced due to the unevenness that may exist in the screen while using.

Figure 5:
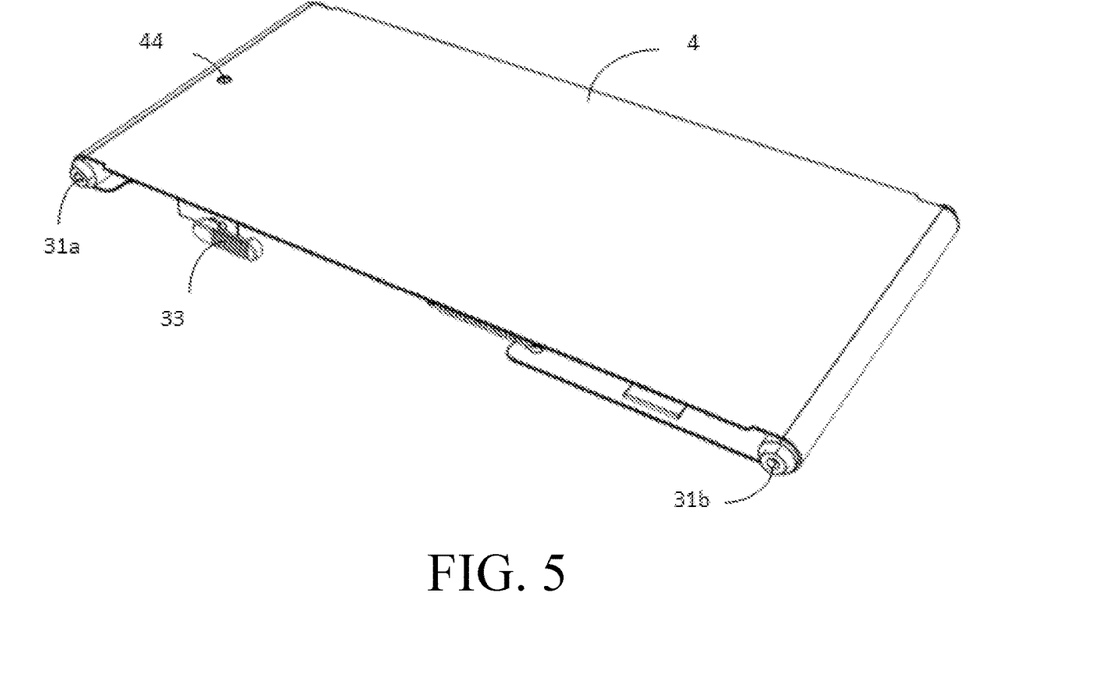
FIG. 5 is a schematic diagram of a front view structure of a flexible display module prior to being assembled in an embodiment of the application.
Figure 6:
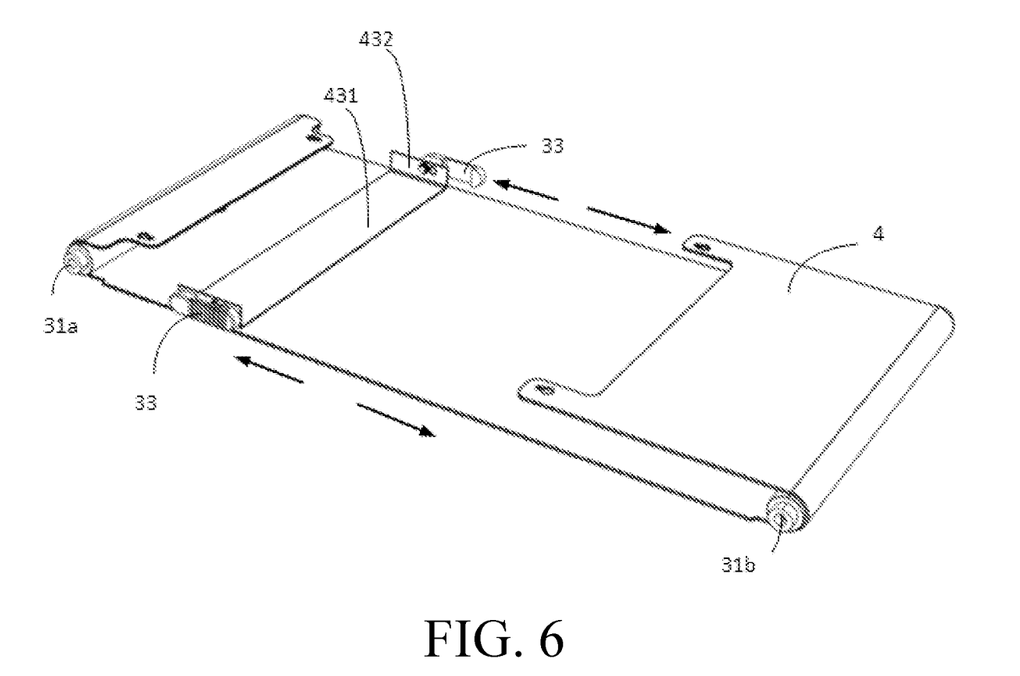
FIG. 6 is a schematic diagram of a rear view structure of the flexible display module after being assembled in an embodiment of the application.

Furthermore, as shown in FIGS. 5 and 6, the rotating mechanism 30 may comprise a first reel 31a and a second reel 31b, and the upper and lower ends of the middle frame 3 are respectively provided with the first reel 31a and the second reel 31b. The first reel 31a and the second reel 31b are respectively disposed in an inner area of the first bendable portion BA1 and the second bendable portion BA2, so as to facilitate the scrolling assembly of the flexible display module 4 being hidden in the middle frame 3, and ensures that the flexible display module 4 can be scrolled smoothly, thereby further reducing the failure risk of screen. The material of the reel 31 may be a high-strength metal or alloy, such as a high-strength aluminum alloy.

In an embodiment of the present application, as shown in FIGS. 2A, 2B, 6 and 10, the driving mechanism 40 comprises a push plate 43 and an elastic push-pin 33, and the push plate 43 is disposed on the flexible display below the module 4. The push plate 43 comprises a flat area 431 and at least one side area 432, the flat area 431 is attached to the metal supporting plate 41, and the at least one side area 432 is provided with a first hole 4321 and a second hole 4322.

Herein, a material of the push plate 43 is a rigid metal or alloy, such as a thin stainless steel plate or an aluminum alloy. In this application, by providing the rigid push plate 43, when the entire flexible display module 4 is connected to the middle frame 3, the push plate 43 drives the flexible display module 4 along the middle frame 3. The structure slides smoothly and reliably up and down. In turn, the screen can maintain better flatness and reduce the impact of user experience due to possible unevenness of the screen during use, thereby reducing the failure risk of screen. Therefore, the flexible display module 4 of the present application is simple to assemble, has a higher yield, lower cost, and has a lower failure risk of screen.

Figure 8:
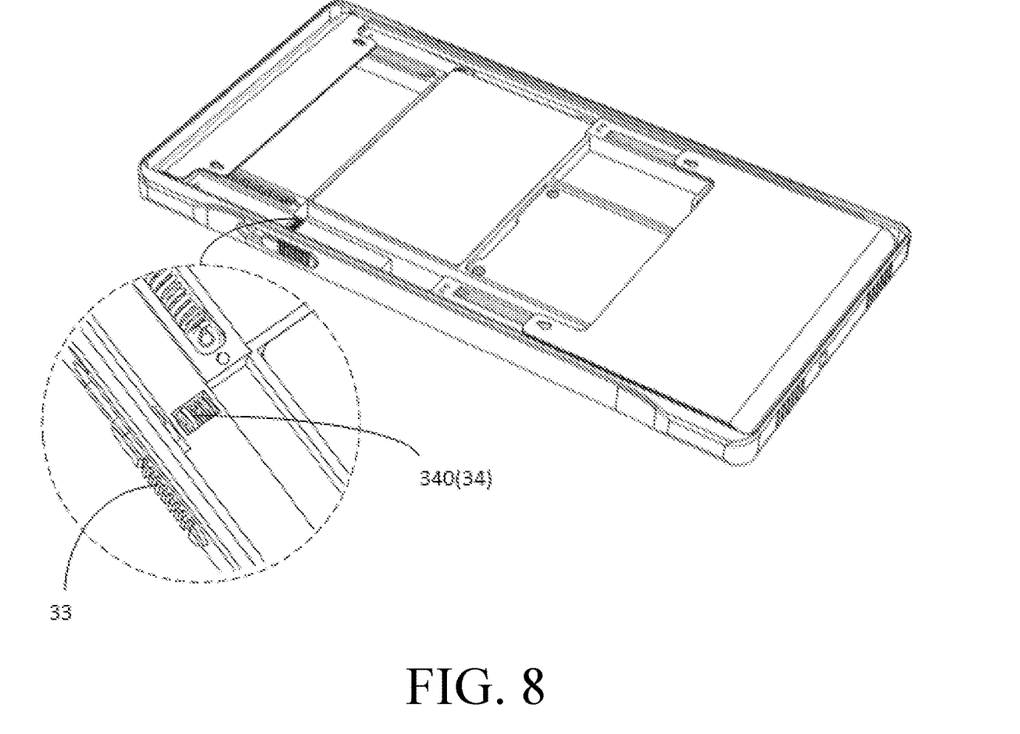
FIG. 8 is a schematic diagram of a positional relationship between an elastic push-pin and a positioning member in an embodiment of the application.
Figure 9:
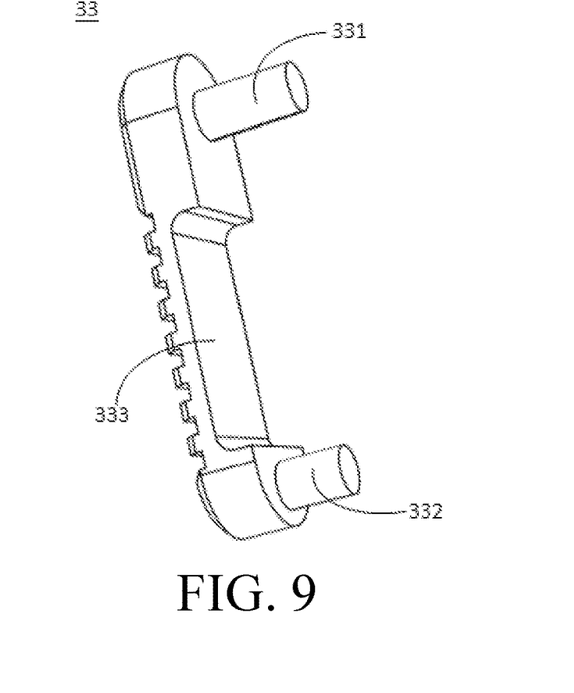
FIG. 9 is a schematic structural diagram of an elastic push-pin in an embodiment of the application.

Furthermore, as shown in FIGS. 8 and 9, the elastic push-pin 33 is disposed on at least one side surface of the middle frame 3 and is located in a hollow portion of at least one side surface of the middle frame 3, and the elastic push-pin 33 comprises a first protrusion 331 and a second protrusion 332. The connecting portion 333 connects the first protrusion 331 and the second protrusion 332 on both sides, and a thickness of the middle area of the connecting portion 333 is less than a thickness of the thickness of the two sides of the connecting portion 333. The elastic push-pin 33 is correspondingly connected to the at least one side area 432 of the push plate 43.

Specifically, a material of the elastic push-pin 33 may be stainless steel, and the thickness of the middle area of the connecting portion 333 is set to be smaller than the thickness of the two sides so that the connecting portion 333 can have certain elasticity. The first protrusion 331, the second protrusion 332, and the connecting portion 333 form a C-shaped structure, which facilitates unlocking the positioning member 34 and simultaneously pushes the elastic push-pin 33 to drive the push plate 43 and has the function of sliding, so the elastic push-pin 33 has functions of driving the push plate 43 to slide and unlocking the positioning member 34 at the same time.

It is understood that the elastic push-pin 33 can drive the push plate 43 to slide manually or automatically, which is not specifically limited here.

Furthermore, the connecting portion 333 may have a non-slip pattern structure to facilitate pushing the elastic push-pin 33.

In an embodiment of the present application, the driving mechanism 40 further comprises a limiting mechanism 340, and the limiting mechanism 340 comprises a positioning member 34. The positioning member 34 is disposed in the middle frame 3, and first hole 4321 and the second hole 4322 of the push plate 43 slidably correspond to the positioning member 34.

Figure 10:
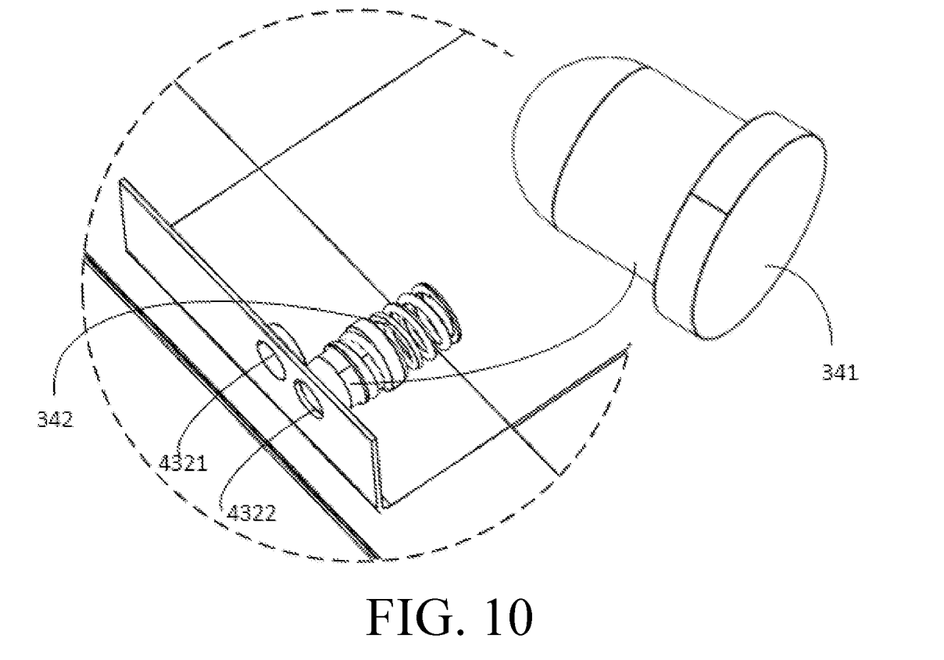
FIG. 10 is a schematic diagram of a structure of a positioning member in the embodiment of the application.

In an embodiment of the present application, one end of the positioning member 34 is provided with an elastic member 342, and the positioning member 34 and the elastic member 342 are connected and fixed in the middle frame 3.

Specifically, as shown in FIG. 10, the positioning member 34 comprises a round-head positioning pin 341 and the elastic member 342, a material of the round-head positioning pin 341 is metal such as stainless steel, and a material of the elastic member 342 can be spring steel.

The positioning member 34 has a certain compressive force on the round-head positioning pin 341 by the elastic member 342, and the round-head positioning pin 341 can interact with the first positioning pin 341 by the compressive force. The hole 4321 or the second hole 4322 is engaged to fix the flexible display module 4, so that accurate and reliable positioning can be achieved in the state of full-screen display or front camera mode, which is convenient for the camera and the light transmitting area 44 being positioned so as to avoid the problem of blurring caused by insufficient light transmission of the front camera.

In one embodiment, when the display device is running the second function (that is, when in the front camera mode), the elastic push-pin 33 drives the push plate 43 to slide down so that the second hole 4322 and the round-head positioning pin 341 are engaged to expose the additional function area 44, so that the additional function area 44 is aligned with the sensing unit (such as a camera). In addition, when the display device runs the second function (that is, when in the full-screen display mode), the elastic push-pin 33 drives the push plate 43 to slide upward to disengage the second hole 4322 from the round positioning pin 341 so that the light-transmitting area 44 is scrolled and hidden in corresponding to the area of the first reel 31a or in the middle frame 3, the round-head positioning pin 341 is engaged under the push plate 43. Therefore, accurate and reliable positioning can be achieved by the simple structure of the positioning member 34.

In another embodiment of the present application, when in the front camera mode, the elastic push-pin 33 drives the push plate 43 to slide down so that the first hole 4321 is engaged with the round-head positioning pin 341 to expose the light-transmitting area 44 so that the light-transmitting area 44 is aligned with the camera. In addition, when in the full-screen display mode, the elastic push-pin 33 drives the push plate 43 to slide up to make the first hole 4321 is separated from the round head positioning pin 341 so that the light-transmitting area 44 is scrolled and hidden in the area corresponding to the first reel 31a or the middle frame 3, and the round-head positioning pin 341 is engaged with the second hole 4322. Therefore, accurate and reliable positioning can be achieved by the simple structure of the positioning member 34.

In an embodiment of the present application, the first protrusion 331 of the elastic push-pin 33 is engaged with the first hole 4321 of the push plate 43, and the second protrusion 332 is engaged with the second hole 4322 of the push plate 43.

In an embodiment of the present application, when the front camera mode is converted to full-screen display mode, the second protrusion 332 is engaged with the second hole 4322 of the push plate 43 to compress the elastic member 342 to disengage the round-head positioning pin 341 from the second hole 4322, so that the elastic push-pin 33 can drive the push plate 43 to slide up, and the light-transmitting area 44 is scrolled and hidden in the corresponding first hole 4322. In the area of a reel 31a or in the middle frame 3, the round-head positioning pin 341 is engaged under the push plate 43 to realize a full-screen display.

Furthermore, in another embodiment of the present application, when the full-screen display is switched to the front camera mode state, the first protrusion 331 is engaged with the first hole 4321 of the push plate 43 to compress the elastic member 342 to disengage the round positioning pin 341 from the first hole 4321, so that the elastic push-pin 33 can drive the push plate 43 to slide up, and the light-transmitting area 44 is rolled and hidden in the corresponding place. In the area of the first reel 31a or in the middle frame 3, the round head positioning pin 341 is engaged with the second hole 4322 to realize a full-screen display.

Therefore, the elastic push-pin 33 has the functions of driving the push plate 43 to slide and unlocking the positioning member 34 at the same time.

In an embodiment of the present application, the cover 5 may be a glass cover to protect the flexible display module 4.

The present application also provides a display apparatus, which comprises the above-mentioned display device 100 and a sensing unit. The sensing unit is arranged in the middle frame 3, and when the display device 100 runs the second function, the sensing unit is arranged corresponding to the additional function area 44 of the flexible display module 4.

In summary, the display device provided by this application has the following beneficial effects:

The first bendable portion BA1 and the second bendable portion BA2 of the flexible display module 4 are respectively slidably fitted with the upper and lower ends of the middle frame 3 by the first reel 31*a* and the second reel 31*b*. The additional function area 44 slidably corresponds to the sensing unit; and is connected to the first end 413 and the second end 414 via the first elastic member 32, so that the flexible display module 4 is connected to the middle frame 3 and is easy and reliable to assemble, and thus the screen can maintain a better flatness. Through the corresponding relationship between the push plate 43, the elastic push-pin 33 and the positioning member 34, the flexible display module 4 can be driven to slide smoothly and reliably along the structure of the middle frame 3 by the push plate 43. The elastic push-pin 33 facilitates unlocking the positioning member 34 and simultaneously drives the push plate 43 to slide. Accurate and reliable positioning of the positioning member 34 can be achieved, which facilitates the positioning of the sensing unit and the additional function area 44, thereby avoiding the problem of blurring of the camera due to insufficient light transmission of the front camera.

Therefore, the display device of the present application has simple structure, high yield, low cost of components, and low failure risk of screen. It can be configured to solve technical problems such as higher cost, higher failure risk of screen, the complex assembly, low yield, and low yield of hidden cameras in the current technology.

In the above-mentioned embodiments, the description of each embodiment has its own focus. For portions that are not described in detail in an embodiment, reference may be made to related descriptions of other embodiments.

The embodiments of the application are described in detail above, and specific examples are used in this article to illustrate the principles and implementation of the application. The descriptions of the above embodiments are only configured to help understand the technical solutions and core ideas of the application; this field Ordinary technical personnel should understand that: they can still modify the technical solutions described in the foregoing embodiments, or equivalently replace some of the technical features; and these modifications or replacements do not divorce the essence of the corresponding technical solutions from this application The scope of the technical solution of each embodiment.

What is claimed is:

1. A display device, comprising:
   a middle frame, comprising a first side surface and a second side surface;
   a rotating mechanism arranged in the middle frame;
   a flexible display module, comprising a display area and an additional function area, wherein a light-emitting surface of the flexible display module is arranged on the first side surface and away from the second side surface, the flexible display module comprises at least a first bendable portion, and the first bendable portion extends from the first side surface of the middle frame to the second side surface around the rotating mechanism; and
   a driving mechanism, arranged in the middle frame and connected to the flexible display module, configured to drive the additional function area of the flexible display module to the second side surface when the display device runs a first function, or configured to drive the additional function area of the flexible display module to the first side surface when the display device runs a second function, wherein the flexible display module further comprises a second bendable portion disposed opposite to the first bendable portion, and the second bendable portion extends from the first side surface of the middle frame to the second side surface and surrounds the rotating mechanism; and
   the display device further comprises a stretching mechanism provided on a second side surface of the middle frame, and the stretching mechanism is respectively connected with the first bendable portion and the second bendable portion of the flexible display module.

2. The display device according to claim 1, wherein the flexible display module comprises a metal supporting plate and a display panel arranged on the metal supporting plate, the metal supporting plate comprises a first end and a second end, the first end portion corresponds to the first bendable portion of the second side surface, and the second end portion corresponds to the second bendable portion of the second side surface; and
   the stretching mechanism comprises a plurality of first elastic members, one end of the plurality of first elastic members is fixed in the middle frame and the other end is respectively connected with the first end and the second end.

3. The display device according to claim 2, wherein a tensile force of the first elastic member connected to the first end is equal to the tensile force of the first elastic member connected to the second end.

4. The display device according to claim 2, wherein the first end portion and the second end portion are provided with notches, and the first elastic member is connected to the first end and the second end through the notches.

5. The display device according to claim 4, wherein:
   the notches located at the first end are paired and arranged symmetrically with a center line of the flexible display module, and the notches located at the second end are paired and arranged symmetrically with a center line of the flexible display module, and each first elastic member is correspondingly connected with a notch.

6. The display device according to claim 1, wherein:
   the rotating mechanism comprises a first reel and a second reel arranged in the middle frame, and the first reel and the second reel are respectively correspondingly arranged in an inner area of the first bendable portion and the second bendable portion.

7. The display device according to claim 1, wherein the driving mechanism comprises a push plate and an elastic push-pin, wherein:
   the push plate is arranged under the flexible display module, the push plate comprises a flat area and at least one side area, the flat area is attached to the flexible display module, and the at least one side area is provided with a first hole and second hole;
   the elastic push-pin is arranged on at least one side surface of the middle frame, and is located in a hollow portion of at least one side surface of the middle frame, the elastic push-pin comprises a first convex portion and a second convex portion and a connecting portion connecting the first convex portion and the second convex portion on both sides thereof, and a thickness of the middle area of the connecting portion is smaller than a thickness of the both sides; and the elastic push-pin is correspondingly connected to the at least one side area of the push plate.

8. The display device according to claim 7, wherein the driving mechanism further comprises a limiting mechanism, the limiting mechanism comprises a positioning member, the positioning member is arranged in the middle frame, and the first hole and the second hole of the push plate slidingly correspond to the positioning member.

9. The display device according to claim 8, wherein an elastic member is provided at one end of the positioning member, and the positioning member is connected to the elastic member and fixed in the middle frame.

10. The display device according to claim 7, wherein the first protrusion of the elastic push-pin is engaged with the first hole of the push plate, and the second protrusion is engaged with the second hole of the push plate.

11. A display apparatus, comprising the display device according to claim 1 and a sensing unit, the sensing unit is arranged in the middle frame, and when the display device runs a second function, the sensing unit is arranged corresponding to the additional function area of the flexible display module.

12. The display apparatus according to claim 11, wherein the flexible display module further comprises a second bendable portion disposed opposite to the first bendable portion, and the second bendable portion extends from the first side surface of the middle frame to the second side surface and surrounds the rotating mechanism; and the display device further comprises a stretching mechanism provided on a second side surface of the middle frame, and the stretching mechanism is respectively connected with the first bendable portion and the second bendable portion of the flexible display module.

13. The display apparatus according to claim 12, wherein the flexible display module comprises a metal supporting plate and a display panel arranged on the metal supporting plate, the metal supporting plate comprises a first end and a second end, the first end portion corresponds to the first bendable portion of the second side surface, and the second end portion corresponds to the second bendable portion of the second side surface; and the stretching mechanism comprises a plurality of first elastic members, one end of the plurality of first elastic members is fixed in the middle frame and the other end is respectively connected with the first end and the second end.

14. The display apparatus according to claim 13, wherein a tensile force of the first elastic member connected to the first end is equal to the tensile force of the first elastic member connected to the second end.

15. The display apparatus according to claim 13, wherein the first end portion and the second end portion are provided with notches, and the first elastic member is connected to the first end and the second end through the notches.

16. The display apparatus according to claim 15, wherein:
the notches located at the first end are paired and arranged symmetrically with a center line of the flexible display module, and the notches located at the second end are paired and arranged symmetrically with a center line of the flexible display module, and each first elastic member is correspondingly connected with a notch.

17. The display apparatus according to claim 12, wherein:
the rotating mechanism comprises a first reel and a second reel arranged in the middle frame, and the first reel and the second reel are respectively correspondingly arranged in an inner area of the first bendable portion and the second bendable portion.

18. The display apparatus according to claim 11, wherein the driving mechanism comprises a push plate and an elastic push-pin, wherein:
the push plate is arranged under the flexible display module, the push plate comprises a flat area and at least one side area, the flat area is attached to the flexible display module, and the at least one side area is provided with a first hole and second hole;
the elastic push-pin is arranged on at least one side surface of the middle frame, and is located in a hollow portion of at least one side surface of the middle frame, the elastic push-pin comprises a first convex portion and a second convex portion and a connecting portion connecting the first convex portion and the second convex portion on both sides thereof, and a thickness of the middle area of the connecting portion is smaller than a thickness of the both sides; and
the elastic push-pin is correspondingly connected to the at least one side area of the push plate.

19. The display apparatus according to claim 18, wherein the driving mechanism further comprises a limiting mechanism, the limiting mechanism comprises a positioning member, the positioning member is arranged in the middle frame, and the first hole and the second hole of the push plate slidingly correspond to the positioning member.

* * * * *